(No Model.)

C. S. BRADLEY.
METHOD OF AND APPARATUS FOR CHANGING PERIOD AND PHASE OF ALTERNATING CURRENTS.

No. 525,312.　　　　　　　　　　Patented Aug. 28, 1894.

Witnesses
C. E. Ashley
H. W. Lloyd.

Inventor
Charles S. Bradley
By his Attorney
Roff H. Read

UNITED STATES PATENT OFFICE.

CHARLES S. BRADLEY, OF AVON, NEW YORK.

METHOD OF AND APPARATUS FOR CHANGING PERIOD AND PHASE OF ALTERNATING CURRENTS.

SPECIFICATION forming part of Letters Patent No. 525,312, dated August 28, 1894.

Application filed July 10, 1893. Serial No. 480,016. (No model.)

*To all whom it may concern:*

Be it known that I, CHARLES S. BRADLEY, a citizen of the United States, residing in Avon, in the county of Livingston and State of New York, have invented certain new and useful Improvements in Changing the Period and Phase of Alternating Currents, of which the following is a specification.

This invention relates to a method of and apparatus for changing the time period of a simple alternating current and developing therefrom a plurality of polyphase alternating currents. I carry out the invention by operating by a single phase alternating current a synchronous motor by which I rotate in a magnetic field at a fractional or multiple speed one or more electric circuits in which the current or currents of different time periods are to be generated.

The several features of novelty of my invention will be more particularly hereinafter described and will be definitely indicated in the claims appended to this specification.

Figure 1:
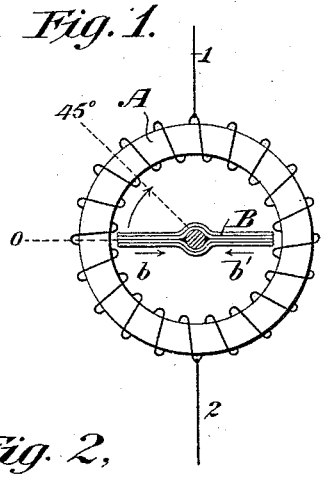
Figure 3:
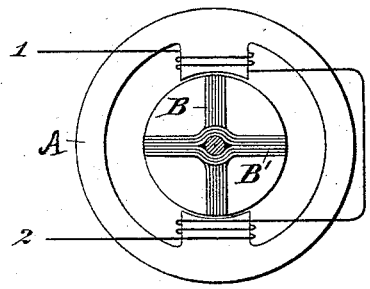
Figure 2:
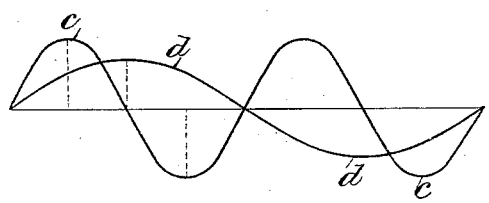
Figure 6:
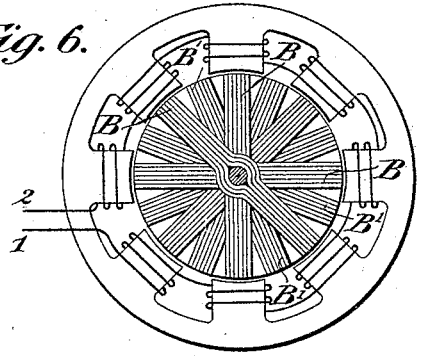
Figure 4:
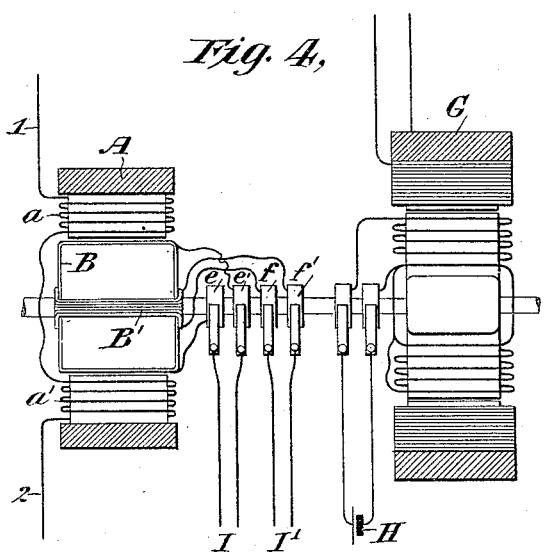
Figure 5:
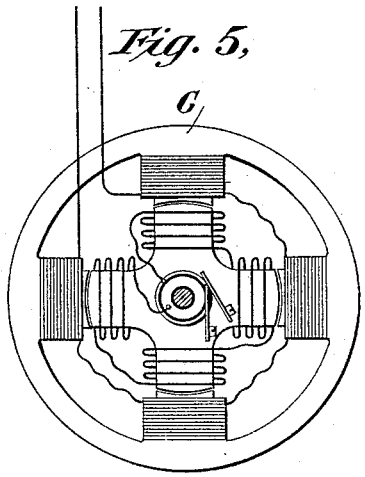

In the accompanying drawings which illustrate my invention, Figures 1, 2 and 3 are diagrams illustrating my method of altering the rate of frequency of a simple alternating current and developing therefrom two quarter phase alternating currents. Figs. 4 and 5 are a longitudinal sectional view and side elevation respectively of part of a machine adapted to carry out my invention; and Fig. 6 is a diagrammatic view of a system of generating circuits and poles adapted to co-operate with a synchronous motor such as shown in Figs. 4 and 5 to increase the frequency of the alternating current.

Referring first to Fig. 1, let it be supposed that I have wound on the ring core A a closed electric circuit tapped at two diametrically opposite points by conductors 1, 2 leading to a generator of simple alternating currents or magnetizing coils wound in any suitable way to develop consequent poles in the core. Under these circumstances there will be developed in the magnetic circuit formed by the ring core a fluctuating magnetic field, the poles of which will be definitely located and which will reverse in sign with the reversals of the simple polarizing current. If a circuit B be revolved within this fluctuating field so that it makes one complete revolution for each complete wave of the alternating current, or, in other words, if the rate of revolution of the circuit B be synchronous with the rate of the simple current supplied over the conductors 1, 2, no induction will be developed in the circuit B. This results from the principles, first, that the inductive effect upon the circuit B by fixed poles of uniform strength would increase as the sine of the angle in a movement from the position indicated to a position at right angles thereto; and second, that a similar inductive effect might be produced by having the circuit B stationary and causing the magnetic field it cuts to fluctuate in a sinusoidal way; that is to say, to vary in strength so that the curve of magneto-motive-force would be a sine curve. Therefore, if I assume that the poles developed in the ring by the alternating current are following the same sine law and correspondingly changing in intensity during movement of the circuit B, there would at any instant be developed in the circuit B opposing electro-motive-forces, as indicated by the arrows $b$, $b'$, one due to motion and the other due to the fluctuation of pole strength, these two electro-motive-forces exactly neutralizing one another. If, however, the circuit B is rotated at some other than synchronous speed there will be developed in it two electro-motive-forces, one due to motion and the other due to fluctuation of pole strength, which will at any instant differ in value and yield a resulting current, the time period of which will depend upon the difference in rate of the exciting current and speed of motion. For example, let it be supposed that the shaft upon which the circuit B is mounted is being rotated at half the speed per second of the frequency of the alternating current supplied at terminals 1, 2. The wave $c$, Fig. 2, may then be assumed to represent the wave of magneto-motive-force in the magnetic circuit A, and the wave $d$ may be taken to represent the wave of induced current in the circuit B, for during the time that the magnetic pole is fluctuating from zero to maximum positive strength, assuming the portion of the curve above the line in Fig. 2 to be positive and that below the line to be negative, the circuit B will have shifted from the position indicated in full lines in Fig. 1 to an angle of forty-five degrees therewith, as indicated by the dotted line, developing a gradually increasing induction because the circuit is turning at only half the rate of change in pole strength, and during the decline of pole strength to zero the rate of cutting of the lines of force due to motion of the circuit B gradually increasing, the generated electro-motive-force will be continuously increasing in strength, until, when the poles in the magnetic circuit A are about to reverse, the circuit B will have assumed a vertical position ninety degrees distant from its point of starting, and while the circuit B proceeds through a second angle of ninety degrees, the pole will again fluctuate from zero to maximum and back to zero again, but since the circuit B is now moving away from the pole and the pole has changed sign, the induced electro-motive-force will still be in the same direction, resulting in half a wave $d$ during the first half revolution of the circuit which corresponds to a complete wave of current in the magnetizing circuit. In other words, during the time that a complete wave of magneto-motive-force has been developed by the inducing current, a half wave of electro-motive-force has been developed in the induced circuit. During the next half revolution of the circuit B the second half of the wave $d$ will be developed, since its coils are now one hundred and eighty degrees distant in position from the position first assumed. If I imagine two such circuits as B placed at right angles to one another upon an iron core, as indicated in Fig. 3, evidently there would be induced in the two circuits B, B' two currents having a difference of phase of ninety degrees, each of which has one-half the frequency of the primary alternating current. To develop, therefore, a secondary alternating current of half the frequency of the primary current, it is only necessary to develop a magnetic field by the direct action of the primary current and to rotate within such field a secondary circuit at half speed, that is to say, so that it will pass the poles of said field at half the rate of the alternating current, a result which may be readily accomplished in the case of a bipolar field by mounting upon one end of the shaft carrying the circuit the armature of a four pole synchronous motor which will act as a controller.

In Figs. 4 and 5 I have illustrated such an organization, A representing the magnetic circuit described in Fig. 1 and provided with two polarizing coils so as to develop at any instant in the pole pieces $a$, $a'$ opposite poles when the terminals 1, 2 are connected with a simple alternating current circuit, and B, B' representing two coils at right angles carried by a laminated core mounted to rotate in said field, said coils being carried to two pairs of contact rings $e$, $e'$, and $f$, $f'$, G representing a four pole synchronous motor, the field-magnet circuit of which may be polarized by a source of continuous current, as shown at H, and the armature circuit of which will preferably be connected with the same source of simple alternating current to which the terminals 1 and 2 are connected, so that the time period of its current is the same as that energizing magnetic circuit A. Under these circumstances there will be developed in the external circuits I, I' alternating currents of half the frequency of the primary alternating current and having a phase difference of ninety degrees. If more than two poles were developed in the ring A the synchronous motor would of course require twice as many poles so as to rotate the circuits B, B' at half speed and the latter would be set at proper angular distances to develop the result specified. In order to raise the frequency the circuits B, B' will be driven at twice the speed of the rate of the line current, or the number of poles developed in magnetic circuit A may be twice the number of poles of the synchronous motor. For example, if the synchronous motor shown in Figs. 4 and 5 be used in connection with a magnetic circuit such as is shown in Fig. 6, having eight poles, upon which are mounted two systems of conductors, the coils of one system being displaced with reference to the other system half the distance between adjacent poles, an alternating current of twice the frequency will be developed in the coil systems B, B'. This will be evident from a further inspection of Fig. 2, where the curve $d$ may in this case be regarded as graphically representing the fluctuation of magnetism, and the curve $c$ as that of electro-motive-force in one of the circuits B, B' of Fig. 6. As the circuit B or B' moves past twice as many poles in a given time as the revolving portion of the synchronous motor, a complete wave of electro-motive-force will be induced during a half wave of the line current.

What I claim as my invention is—

1. The method of altering the frequency of an alternating current consisting in creating an alternating magnetic field by such current and rotating in said field a conductor or circuit so as to pass the poles of said field at a rate evenly divisible by or into the rate of the alternating current.

2. The method of reducing the frequency of an alternating current consisting in creating an alternating magnetic field by such current, and rotating in said field a conductor or circuit so as to pass its poles at a fractional part of the rate of the alternating current.

3. The method of developing from an alternating current a second alternating current of half its frequency consisting in creating an alternating field by the first circuit and rotating in said field a conductor or circuit so as to pass its poles at half the rate of the alternating current.

4. Means for altering the frequency of an alternating current consisting of a synchronous motor operated by such current and a generating circuit or armature driven by the motor in a magnetic field developed by said alternating current, said field having a number of poles evenly divisible by or into the number of poles of the synchronous motor.

5. Means for developing from a single alternating current a secondary current of half the frequency, comprising a synchronous motor operated by the alternating current, a generating circuit or armature mounted on the motor shaft, and a magnetic field having half the number of poles of the synchronous motor polarized by the alternating current and embracing the rotating circuit or armature.

6. Means for developing from a simple alternating current two quarter phase currents having half the frequency, comprising a synchronous motor operated by the alternating current, an armature mounted on the motor shaft and rotating in a magnetic field of half the number of poles of the synchronous motor and polarized by the alternating current, said armature having two secondary circuits at an angle to each other to correspond to a phase difference of ninety degrees, and one of which is in alignment with the field poles when they reverse in sign.

In testimony whereof I have hereunto subscribed my name this 6th day of July, A. D. 1893.

CHARLES S. BRADLEY.

Witnesses:
CLARA A. HUNT,
NORA L. HARRIS.